(12) United States Patent  (10) Patent No.: US 6,633,753 B1
Kido                           (45) Date of Patent:     Oct. 14, 2003

(54) RADIO COMMUNICATION APPARATUS WITH POWER CONSUMPTION REDUCED

(75) Inventor: Toru Kido, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/304,824

(22) Filed: May 5, 1999

(30) Foreign Application Priority Data

May 29, 1998 (JP) .......................................... 10-149801

(51) Int. Cl.$^7$ ............................. H04B 1/16; H04Q 7/00
(52) U.S. Cl. .................... 455/343.2; 455/574; 340/7.34
(58) Field of Search ................................ 455/343, 574, 455/573, 572, 127.1–127.7, 343.1–343.6, 502, 503; 340/7.32, 7.33, 7.34, 7.35, 7.36, 7.37, 7.38; 370/311

(56) References Cited

U.S. PATENT DOCUMENTS

| | | | | |
|---|---|---|---|---|
| 4,652,875 A | * | 3/1987 | Waki .......................... | 455/343 |
| 5,303,420 A | * | 4/1994 | Jang ........................... | 455/343 |
| 5,740,517 A | | 4/1998 | Aoshima | |
| 5,760,699 A | * | 6/1998 | Saka et al. .................. | 455/343 |
| 5,778,312 A | * | 7/1998 | Kawashima ................ | 455/343 |

FOREIGN PATENT DOCUMENTS

| | | |
|---|---|---|
| JP | 63-227134 | 9/1988 |
| JP | 2-153633 | 6/1990 |
| JP | 2-260927 | 10/1990 |
| JP | 4-304041 | 10/1992 |
| JP | 4-349724 | 12/1992 |
| JP | 5-276090 | 10/1993 |
| JP | 6-29909 | 2/1994 |
| JP | 6-45988 | 2/1994 |
| JP | 6-140984 | 5/1994 |
| JP | 6-224827 | 8/1994 |
| JP | 6-276136 | 9/1994 |
| JP | 7-170557 | 7/1995 |
| JP | 7-177552 | 7/1995 |
| JP | 7-322329 | 12/1995 |
| JP | 8-51656 | 2/1996 |
| JP | 8-98230 | 4/1996 |
| JP | 8-149542 | 6/1996 |
| JP | 8-163080 | 6/1996 |
| JP | 8-242477 | 9/1996 |
| JP | 8-251645 | 9/1996 |
| JP | 10-23496 | 1/1998 |

OTHER PUBLICATIONS

Japanese Office action with translation of Japanese Examiner's comments.
Japanese Office Action, dated May 20, 1999, with English Language Translation of Japanese Examiner's comments.
Chinese office ation (written in English) dated Feb. 21, 2003.

* cited by examiner

*Primary Examiner*—Dwayne Bost
*Assistant Examiner*—Eliseo Ramos-Feliciano
(74) *Attorney, Agent, or Firm*—Whitham, Curtis & Christofferson, PC

(57) ABSTRACT

A radio communication apparatus includes a receiving section, a power supply section and a control section. The receiving section receives a radio signal when electric power is supplied, and the radio signal has a preamble field for storing a preamble pattern. The power supply section supplies the electrical power to the receiving section and stopping the supply of the electrical power in response to a supply stop signal. The control section generates the supply stop signal when presence of the preamble pattern can not be detected from the radio signal received by the receiving section, in a state in which a frame synchronization is established.

24 Claims, 13 Drawing Sheets

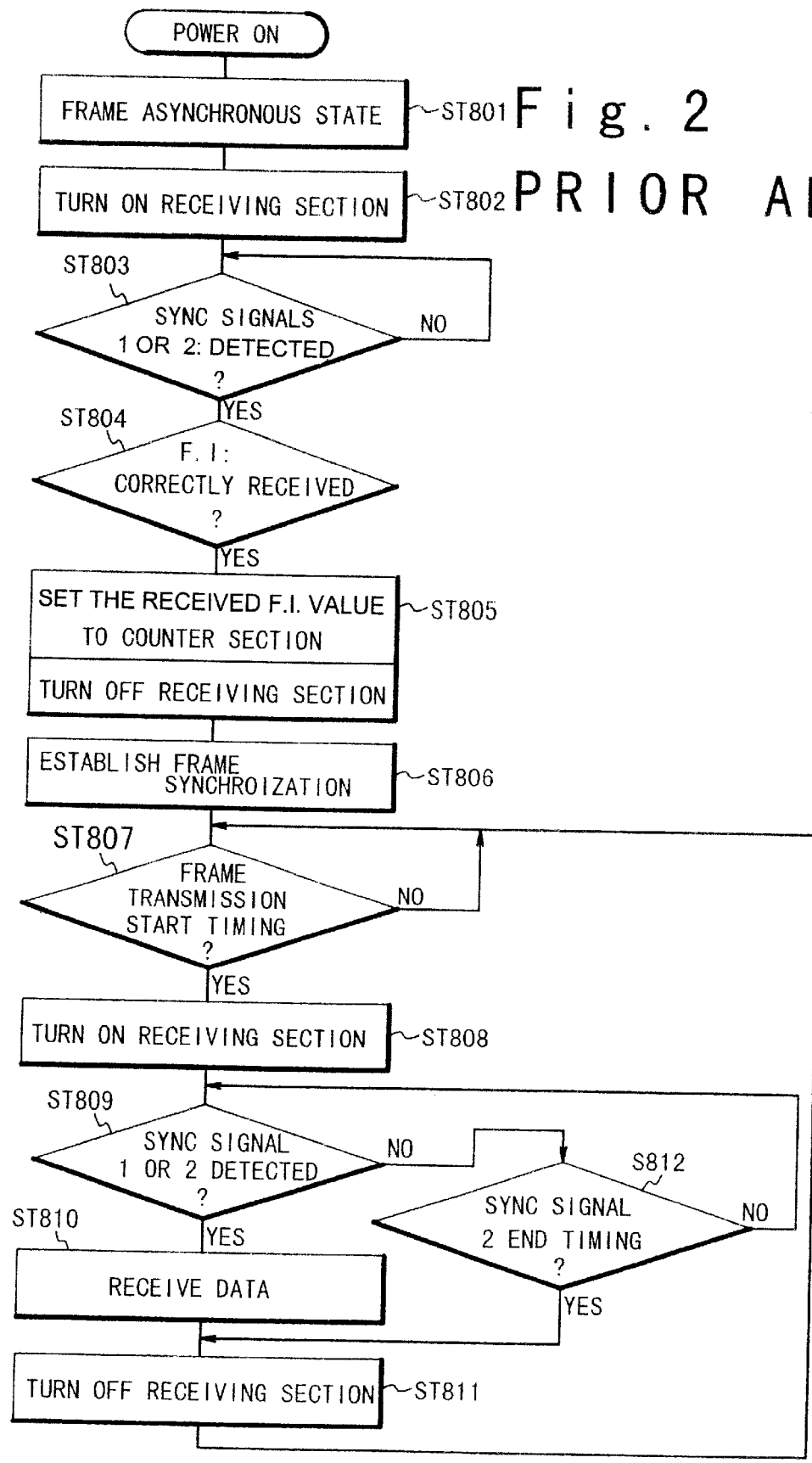

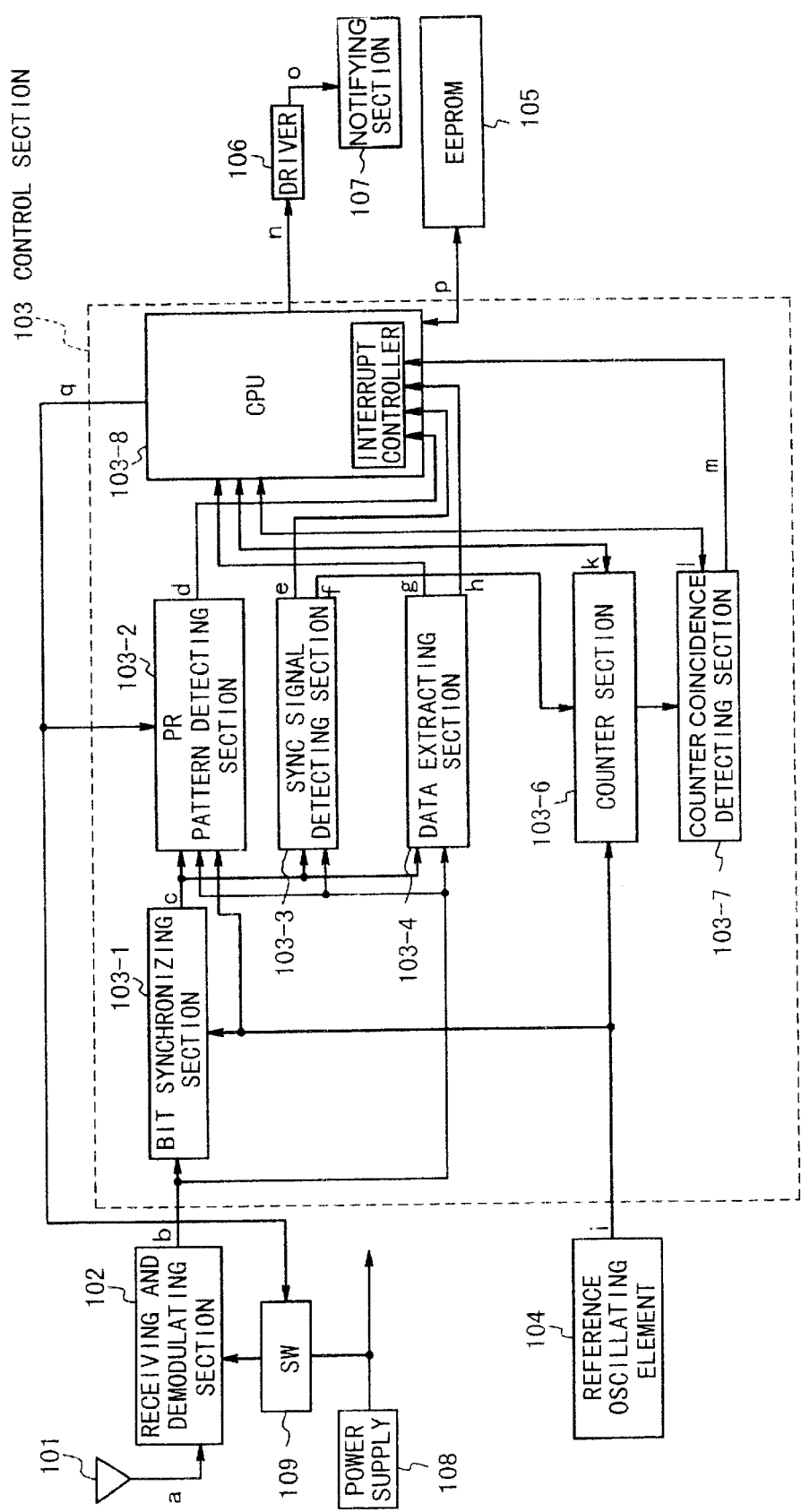

RADIO COMMUNICATION APPARATUS WITH POWER CONSUMPTION REDUCED

BACKGROUND OF THE INVENTION

1. Field of the Invention

The present invention relates to a radio communication apparatus. More particularly, the present invention relates to an intermittent reception control in a radio communication apparatus.

2. Description of the Related Art

In a radio communication apparatus, an intermittent reception is carried out while a power supply to a radio section requiring a large quantity of electric power is controlled to be turned on and off, in order to make a life of a battery longer.

FIGS. 3A to 3C show an example of a format of a transmission signal received by a radio communication apparatus such as a radio selective call receiver. As shown in FIG. 3A, 15 cycles from 0 to 14 correspond to one hour. The 15 cycles of this one hour unit are continuously sent out for 24 hours. As shown in FIG. 3B, each cycle is composed of 120 transmission frames from 0 to 119. As shown in FIG. 3C, one transmission frame is transmitted in, for example, two seconds. The transmission frame is a basic unit of the reception. The radio communication apparatus can receive all the transmission frames.

One transmission frame is composed of a preamble 1 field of 32 bits, a sync signal 1 field of 32 bits, a preamble 2 field of 16 bits, a sync signal 2 field of 32 bits, a frame information (FI) field of 32 bits and a data field.

A preamble (PR) signal in which "1" and "0" are alternately located for 32 bits is stored in the preamble 1 field and used to correct bit synchronization. A sync signal pattern 1 as a particular pattern of 32 bits is stored in the sync signal 1 field and is used to establish word synchronization. A preamble pattern of 16 bits is again stored in the next preamble 2 field. A sync signal pattern 2 is stored in the sync signal 2 field. A data of number of a transmission frame that is being currently transmitted and a cycle number of the transmission frame are stored in the frame information (FI) field. In succession, a message corresponding to at least one identifier (ID) is stored in the data field.

There is a case that all the frames are not transmitted even in a synchronously transmitting system using transmission frames as shown in FIGS. 3A to 3C. Also, there is a case that a part of the transmission frames is used for a transmission using another transmission protocol. In such a case, the transmission is sometimes stopped at a unit of several transmission frames because of the mixture with the other protocol, namely, a transmission stop is carried out.

FIG. 1 shows an example of a manner of the transmission stop in such a synchronization system. Referring to FIG. 1, a period of the transmission stop is not constant, and the number of transmission frames continuously transmitted after the transmission stop is not always constant. The transmission stop is again performed immediately after messages accumulated in the period of the transmission stop are fully transmitted after the start of the transmission. A signal having a different signal format is transmitted during the transmission stop.

In this synchronously transmitting system, the radio communication apparatus determines that the transmission frame is the transmission stop frame, depending upon the reception result. Thus the intermittent reception operation must be carried out on the assumption that there is the transmission of the synchronous transmission frames even during the transmission stop.

A radio communication apparatus for a transmission signal having the synchronous transmission signal format shown in FIGS. 3A to 3C is disclosed in Japanese Laid Open Patent Application (JP-A-Heisei 8-149542). In this cited reference, the intermittent reception control is carried out in accordance with a process flow shown in FIG. 2.

Referring to FIG. 2, in a non-synchronous state after a power supply is turned on (Step ST801), a receiving section is turned on (Step ST802). Then, an operation of detecting the sync signal 1 or 2 of the transmission frame is carried out (Step ST803). If any one of the sync signals 1 and 2 is detected, a transmission frame number of the transmission frame is acquired from the frame information (FI) field (Step ST804). The transmission frame synchronization with the transmission signal is established in response to the acquisition of the transmission frame number (Step ST806). After the synchronous establishment, electrical power is supplied to a receiving section at the timing when a transmission start of the transmission frame is predicted (Step ST807), such that the receiving section is set to an ON state (Step ST808). Then, the detection of the sync signal is carried out as mentioned above (Step ST809).

When the sync signal is detected, data is received from the subsequent data field (Step ST810). When the radio communication apparatus determines that the reception of the effective data within this transmission frame is ended, the supply of the electrical power to the receiving section is turned off without waiting for the end of the transmission frame (Step ST811).

If the sync signal is not detected, the supply of the electrical power to the receiving section is stopped at the timing when the transmission end of the sync signal is predicted, and the receiving section is turned off. Then, the radio communication apparatus waits for a next transmission frame (Step ST812).

In the state that the synchronization with the transmission frame is established, the processes from the step ST807 to the step ST812 are repeated for each transmission frame. Thus, the intermittent reception is carried out. The established state of the synchronization with the transmission frame is cancelled when the transmission frame is not received for a predetermined continuous number of times. As a result, the radio communication apparatus is returned back to the non-synchronous state.

In the method shown in FIG. 2 of carrying out the intermittent reception in the established state of the synchronization with the transmission frame, there is no problem if the transmission frames are always transmitted. However, in a case where the transmission stop periods are present, the radio communication apparatus can not discriminate a case where there is the transmission stop between the transmission frames without and a case where there is not transmission stop between the transmission frames, until actually receiving a radio signal. Thus, the receiving section must carry out the detecting operation up to 112 bits (a total bit number of a preamble (PR) field+a sync signal 1 field+a preamble (PR) field+a sync signal 2 field) in the ON state. Therefore, it is said that the conventional radio communication apparatus is not effective from the viewpoint of making the ON time of the receiving section as short as possible.

In addition to the above-mentioned conventional technique, a non-synchronous type of a radio selection call method is disclosed in Japanese Laid Open Patent Application (JP-A-Showa 63-227134). This reference describes a technique of calling a plurality of called parties with a single dial. However, it does not describe the operation of detecting the preamble pattern at all.

Japanese Laid Open Patent Application (JP-A-Heisei 2-153633) discloses a non-synchronous type of a radio selection call receiver that can detect a preamble in a short time. In this reference, a preamble detecting circuit is kept in an ON state for a certain time in a shorter period than a time corresponding to a length of a preamble field. In this reference, the preamble detecting circuit is not kept in the ON state in synchronization with the preamble field. In addition, the preamble detecting circuit is not kept in the ON state in an entire time of the preamble field. The operation of receiving the data is not carried out if the preamble is not detected in this ON time.

Japanese Laid Open Patent Application (JP-A-Heisei 4-304041) discloses a non-synchronous type of a selection call receiver. According to this reference, a one second timer is used to detect a preamble pattern. Thus, the timer must be excessively added to the receiver, which makes the configuration complex. Even when the preamble pattern does not arrive, the operation of detecting the preamble is always carried out. Therefore, since the receiver is always in the ON state, the electrical power is consumed.

Japanese Laid Open Patent Application (JP-A-Heisei 8-98230) discloses a non-synchronous type of a selective call receiver. In this reference, special time information must be added to a transmission frame when a preamble is detected. Thus, this method is not general.

Japanese Laid Open Patent Application (JP-A-Heisei 10-23496) discloses a non-synchronous type of a selection call receiver. In this reference, the consumed electric power is reduced by stopping the receiving operation until a sync signal is received the predetermined number of times after the synchronous establishment. It is described in this reference that the preamble pattern is detected by the intermittent reception before the synchronous establishment. However, it does not actually describe how to detect the preamble pattern.

SUMMARY OF THE INVENTION

An object of the present invention is to provide a radio communication apparatus which can control an ON time of a receiving section by detecting the presence or absence of a preamble pattern in a state that synchronization with a transmission frame is established in a synchronously transmitting system, and a method of controlling an intermittent reception thereof.

Another object of the present invention is to provide a radio communication apparatus that can effectively detect a transmission stop period by detecting the presence or absence of a preamble pattern, even in a transmission system using a transmission frame having a transmission stop period, and an intermittent reception method.

In order to achieve an aspect of the present invention, a radio communication apparatus includes a receiving section, a power supply section and a control section. The receiving section receives a radio signal when electric power is supplied, and the radio signal has a preamble field for storing a preamble pattern. The power supply section supplies the electrical power to the receiving section and stopping the supply of the electrical power in response to a supply stop signal. The control section generates the supply stop signal when presence of the preamble pattern can not be detected from the radio signal received by the receiving section, in a state in which a frame synchronization is established.

The control section preferably determines that the preamble pattern is not present, to generate the supply stop signal, when a portion coincident with a predetermined reference pattern is not present within the preamble field. In this case, the control section may includes a clock generating circuit which generates a clock signal, and a counter which counts the clock signal, and generates a preamble end time signal when the counted value reaches a first predetermined value. The control section generates the supply stop signal in response to the preamble end time signal, when the portion coincident with the predetermined reference pattern is not detected within the radio signal received by the receiving section.

Also, the radio signal may have a sync signal field for storing a sync signal and a data field for storing a data, in addition to the preamble field. In this case, the control section may includes a sync signal detecting section which detects the sync signal from the radio signal received by the receiving section to generate a sync signal detection signal without generating the supply stop signal, when the presence of the preamble pattern is detected, and a data receiving section which receives the data from the radio signal received by the receiving section, in response to the sync signal detection signal.

Also, the control section outputs the supply stop signal to the power supply section, when the sync signal is not detected during a predetermined period after the control section detects the preamble pattern.

The counter counts the clock signal to a second predetermined value after counting the first predetermined value, and generates a sync signal end time signal when the count value reaches the second predetermined value. In this case, the control section sends the supply stop signal to the power supply section in response to the sync signal end time signal, when the sync signal is not detected while the counter counts the clock signal to the second predetermined value.

In order to achieve another aspect of the present invention, a radio communication apparatus includes a receiving section, a power supply section and a control section. The receiving section receives a radio signal, when an electrical power is supplied in a state in which a frame synchronization is established, the radio signal having a preamble field for storing a preamble pattern. The power supply section supplies the electrical power to the receiving section in response to a supply start signal and stops the supply of the electrical power to the receiving section in response to a supply stop signal. The control section generates the supply start signal at a start timing of the preamble field and generates the supply stop signal when presence of the preamble pattern can not be detected from the radio signal received by the receiving section.

In order to achieve still another aspect of the present invention, a radio communication apparatus includes a receiving section, a power supply section and a control section. The receiving section receives a radio signal, when electrical power is supplied in a state in which a frame synchronization is established, the radio signal having a preamble field for storing a preamble pattern. The power supply section supplies the electrical power to the receiving section in response to a supply start signal and stops the supply of the electrical power to the receiving section in response to a supply stop signal. The control section generates the supply start signal earlier than a start timing of the preamble field by a predetermined time and generates the supply stop signal when presence of the preamble pattern can not be detected from the radio signal received by the receiving section.

In order to achieve yet sill another aspect of the present invention, an intermittently receiving method in a synchronization establishing state in a radio communication apparatus, includes:

receiving a radio signal by a receiving section when an electric power is supplied to the receiving section, the radio signal having a preamble field for storing a preamble pattern;

supplying the electrical power to the receiving section;

stopping the supply of the electrical power to the receiving section in response to a supply stop signal; and generating the supply stop signal when presence of the preamble pattern can not be detected from the radio signal received by the receiving section.

BRIEF DESCRIPTION OF THE DRAWINGS

FIG. 2 is a flowchart to describe the operation of a conventional radio communication apparatus;

FIG. 4 is a block diagram showing the structure of a radio communication apparatus according to a first embodiment of the present invention;

DESCRIPTION OF THE PREFERRED EMBODIMENTS

Figure 1:
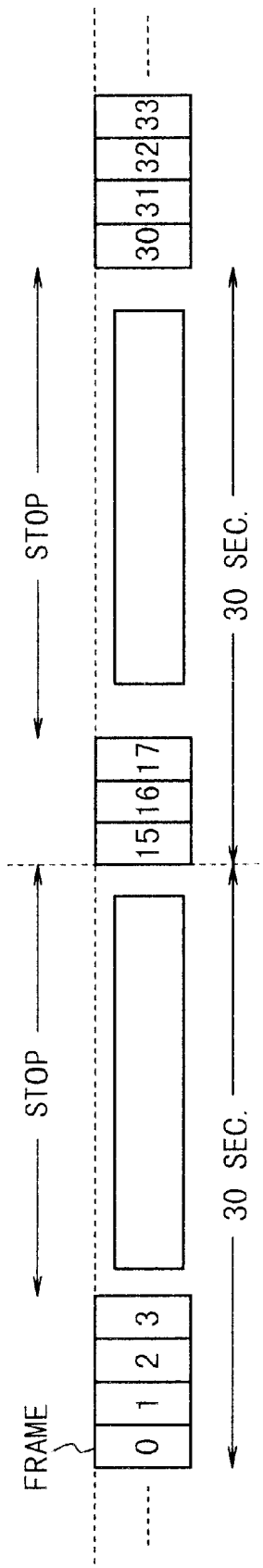
FIG. 1 is a diagram to describe a transmission stop frame.

A radio communication apparatus of the present invention will be described below with reference to the attached drawings. In the following description, an intermittent reception control for the radio communication apparatus will be described taking a radio selection call receiver as an example.

FIG. 4 is a block diagram showing the structure of the radio communication apparatus according to the first embodiment in the present invention. Referring to FIG. 4, the radio communication apparatus according to the first embodiment is composed of an antenna 101, a receiving and demodulating section 102, a control section 103, a reference oscillating element 104, an EEPROM 105, a driver 106, a notifying section 107 and a power supply section. The power supply section is composed of a power supply 108 and a switch (SW) 109.

Figures 3A, 3B, 3C:
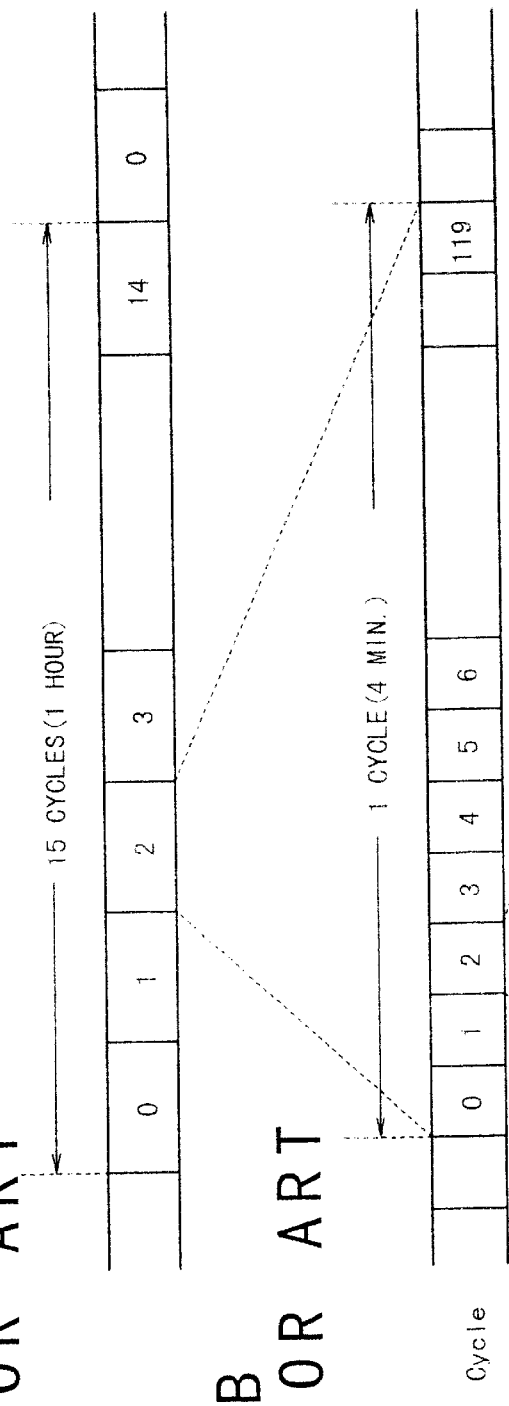
FIGS. 3A to 3C are diagrams to describe a synchronous transmission signal used in the radio communication apparatus.

When the electrical power is supplied from the power supply 108 to the receiving and demodulating section, the receiving and demodulating section 102 amplifies and demodulates a radio signal a received from the antenna 101 and then outputs a demodulated signal b. This radio signal a is a signal having the frame structure shown in FIGS. 3A to 3C.

The reference oscillating element 104 oscillates and generates a reference oscillation clock signal i.

An intra-station ID is set in advance in the programmable read only memory (hereafter, EEPROM) 105 that can be electrically erased and rewritten.

The control section 103 extracts a message and an ID included in transmission data from the demodulated signal b, and compares the ID stored in the EEPROM 105 with the transmitted ID. Then, if determining that both of IDs coincide with each other, and further if there is a message to the inter-station, the control section 103 outputs a drive signal n.

The notifying section 107 is composed of a ringing unit, an oscillating unit, an LED or LCD (a liquid crystal display) and the like. The control section 103 drives the driver 106 with the drive signal n. The driver 106 drives the notifying section 107 through a signal line o to notify the message reception to a user of the receiver.

The power supply 108 supplies the electrical power to the whole apparatus. The switch 109 supplies the electrical power to the receiving and demodulating section 102 in response to a supply start signal q. In addition, the switch 109 stops the supply of the electrical power to the receiving and demodulating section 102 in response to a supply stop signal q.

The control section 103 is composed of a bit synchronizing section 103-1, a preamble (PR) pattern detecting section 103-2, a sync signal detecting section 103-3, a data extracting section 103-4, a counter section 103-6, a counter coincidence detecting section 103-7 and a CPU 103-8 with an interrupt controller.

The bit synchronizing section 103-1 generates a reproduction clock signal c for data sampling, from the demodulated signal b and the reference oscillation clock signal I from the reference oscillating element 104.

The preamble pattern detecting section 103-2 detects, from the reproduction clock signal c, the demodulated signal b and the reference oscillation clock signal i, whether or not the preamble pattern is present in the preamble 1 field or the preamble 2 field of the demodulated signal b. If the presence of the preamble pattern is detected, a detection signal d is set to a Hi level. If the presence of the preamble pattern is not detected, the detection signal d is set to a Lo level. The presence or absence of the preamble pattern is detected by comparing a reference pattern of the predetermined number of bits with a data of the demodulated signal in a preamble field. The number of bits is determined in such a manner that a data transmission frame is not erroneously recognized as a transmission stop frame. Thus, it is necessary to determine a bit number to the extent that the transmission stop frame in the transmission stop can be reliably distinguished from the normal transmission frames. In this embodiment, the reference pattern is composed of five bits.

The sync signal detecting section 103-3 uses the reproduction clock signal c to detect the sync signal from the sync signal 1 field or the sync signal 2 field of the demodulated signal b. If the sync signal is detected, the sync signal detecting section 103-3 outputs a sync signal detection signal f as an interrupt signal e to the interrupt controller of the CPU 103-8. In addition, the detecting section 103-3 outputs a frame sync signal f to the counter section 103-6.

The data extracting section 103-4 has a buffer (not shown), and then uses the reproduction clock signal c to extract a transmission data from the data field including the ID of the demodulated signal b, and further stores it is the buffer, After storing the data in the buffer, the data extracting section 103-4 outputs a data store end signal h as an interrupt signal to the interrupt controller of the CPU 103-8. In addition, the data extracting section 103-4 reads out the data stored in the buffer, and outputs as a data signal g to the CPU 103-8, and then receives the data signal g from the CPU 103-8, and further stores in the buffer.

The counter section 103-6 has a frequency-divider, a bit counter, a transmission frame counter and a cycle counter (all not shown), and then counts the clock signal i in synchronous with the synchronization detection signal f.

The frequency divider divides the clock signal i in frequency. The bit counter counts the reference oscillation clock signal i, and then indicates a present bit position within one transmission frame. Accordingly, a start timing of each of the preamble field, the sync signal field, the FI field and the data field in the transmission frame can be detected by counting a frequency-divided clock signal, until the synchronization state is cancelled, once the synchronization state is established. In other words, the bit counter maintains the synchronization with the respective transmission frames. Thus, the bit counter is used to maintain the synchronization with the transmission frame. The bit counter is reset to a predetermined value in response to the frame sync signal f. The frame counter counts an output from the bit counter to thereby count the number of received frames. The cycle counter counts an output from the transmission frame counter to thereby count the number of received cycles.

The counter coincidence detecting section 103-7 sequentially compares a value 1 set by the CPU 103-8 with the counter value of the counter section 103-6. Then, if detecting the coincidence between the set value 1 and the counter value, the counter coincidence detecting section 103-7 outputs a coincidence signal m to the interrupt controller of the CPU 103-8.

The CPU 103-8 can set a counter value in the counter section 103-6 through a signal line k. In addition, the CPU 103-8 can read out a present counter value as the value 1. That is, the CPU 103-8 sets a value 1 corresponding to a time length of the preamble 1 field, the sync signal 1 field, the preamble 2 field and the sync signal 2 field in the counter coincidence detecting section 103-7. Moreover, the CPU 103-8 reads out transmission frame information from the FI field of the transmission frame stored in the data extracting section 103-4. The transmission frame information includes the information of the transmission frame number and the cycle number. When reading out the transmission frame information, the CPU 103-8 sets the transmission frame value and the cycle value to the frame counter and the cycle counter of the counter section 103-6, respectively.

The CPU 103-8 outputs the supply start signal q to the switch 109 at the timing when the preamble field starts, in the state that the synchronization with the transmission frame is established. Also, the CPU 103-8 knows whether or not the preamble pattern is detected, in accordance with a preamble pattern detection signal from the preamble pattern detecting section 103-2 through the signal line d. The CPU 103-8 selectively outputs the supply stop signal q to the switch 109, in response to the detection signal d from the preamble pattern detecting section 103-2. That is, the CPU 103-8 outputs the supply stop signal q to the switch 109, if the detection signal d is kept in the Lo level when a counter coincidence detection signal m corresponding to the preamble 1 field or the preamble 2 field is inputted.

The CPU 103-8 knows whether or not the sync signal is detected, in accordance with the sync signal detection signal e from the sync signal detecting section 103-3. The CPU 103-8 selectively outputs the supply stop signal q to the switch 109, in response to the sync signal detection signal e from the sync signal detecting section 103-3. That is, the CPU 103-8 outputs the supply stop signal q to the switch 109, if the sync signal detection signal e is not inputted although the counter coincidence detection signal m corresponding to the preamble 1 field or the preamble 2 field is inputted.

In this way, the timing of the supply of the electrical power to the receiving and demodulating section 102 from the power supply 108 is controlled.

Moreover, the CPU 103-8 reads out the reception data from the buffer of the data extracting section 103-4 through the data signal g in response to the data store end signal h from the data extracting section 103-4 to the interrupt controller. The CPU 103-8 outputs a signal n to the driver 106 to inform the message reception to the user of the receiver, if it is determined that the message destined to the intra-station is present, based on the reception data and the inter-station ID stored in advance in the EEPROM 105.

Figure 5:
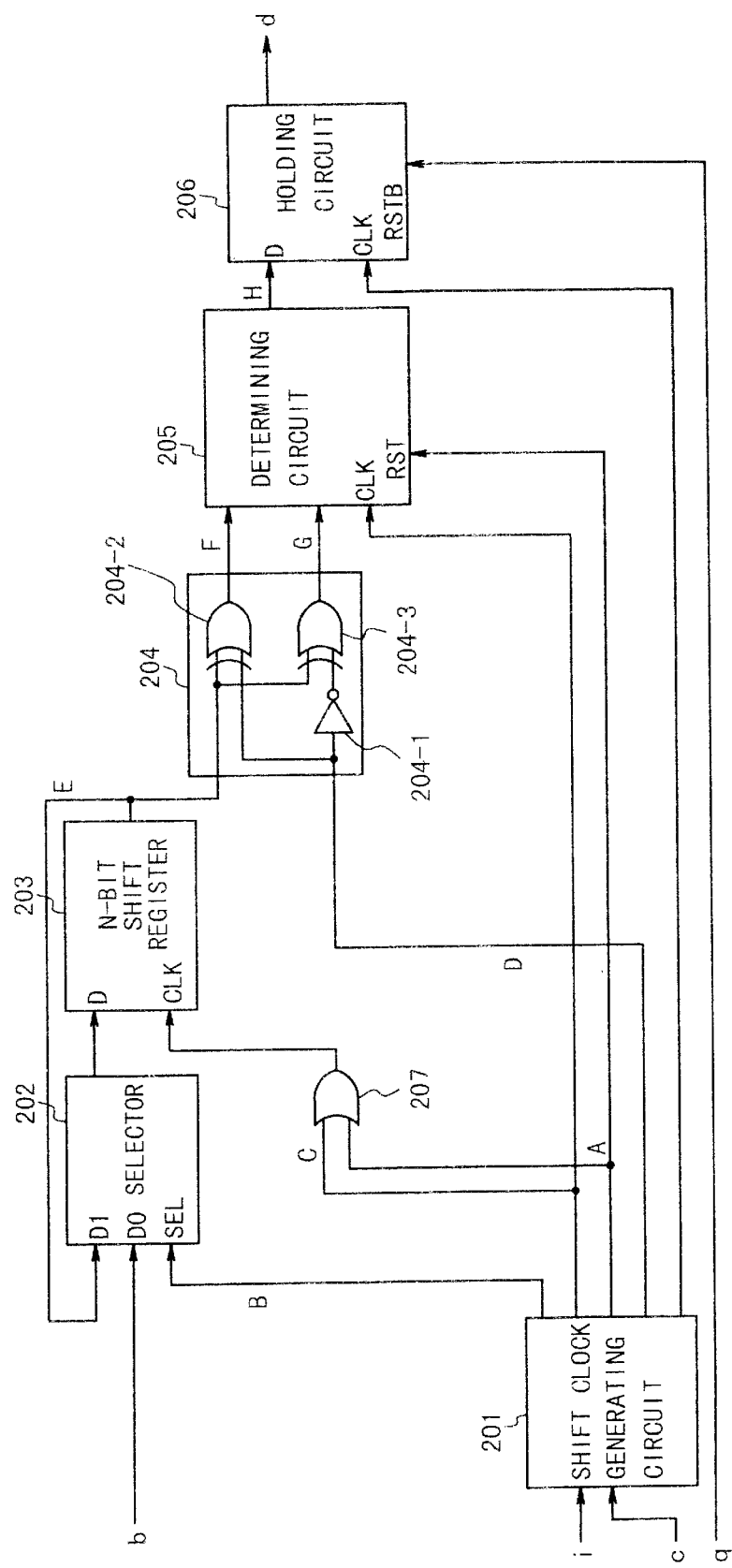
FIG. 5 is a block diagram showing the structure of a preamble pattern detecting section in a radio communication apparatus according to the first embodiment of the present invention.

FIG. 5 is a detailed block diagram of the preamble pattern detecting section 103-2. In FIG. 5, signal lines b, i, c, q and d correspond to the respective signals or signal lines in FIG. 4.

Referring to FIG. 5, the preamble pattern detecting section 103-2 is composed of a shifted clock generating circuit 201, a selector 202, a shift register 203, a comparator 204, a determining circuit 205 and a holding circuit 206.

The clock generating circuit 201 generates timing signals A, B, C, D and I from the reproduction clock signal c and the reference oscillation clock signal i, as shown in FIGS. 6C, 6D, 6E, 6F, and 6G, respectively. Here, it is supposed that the reference oscillation clock signal i is a period when one bit length of the reproduction clock signal c is divided into 28 portions, as shown in FIG. 6B.

Figure 6:
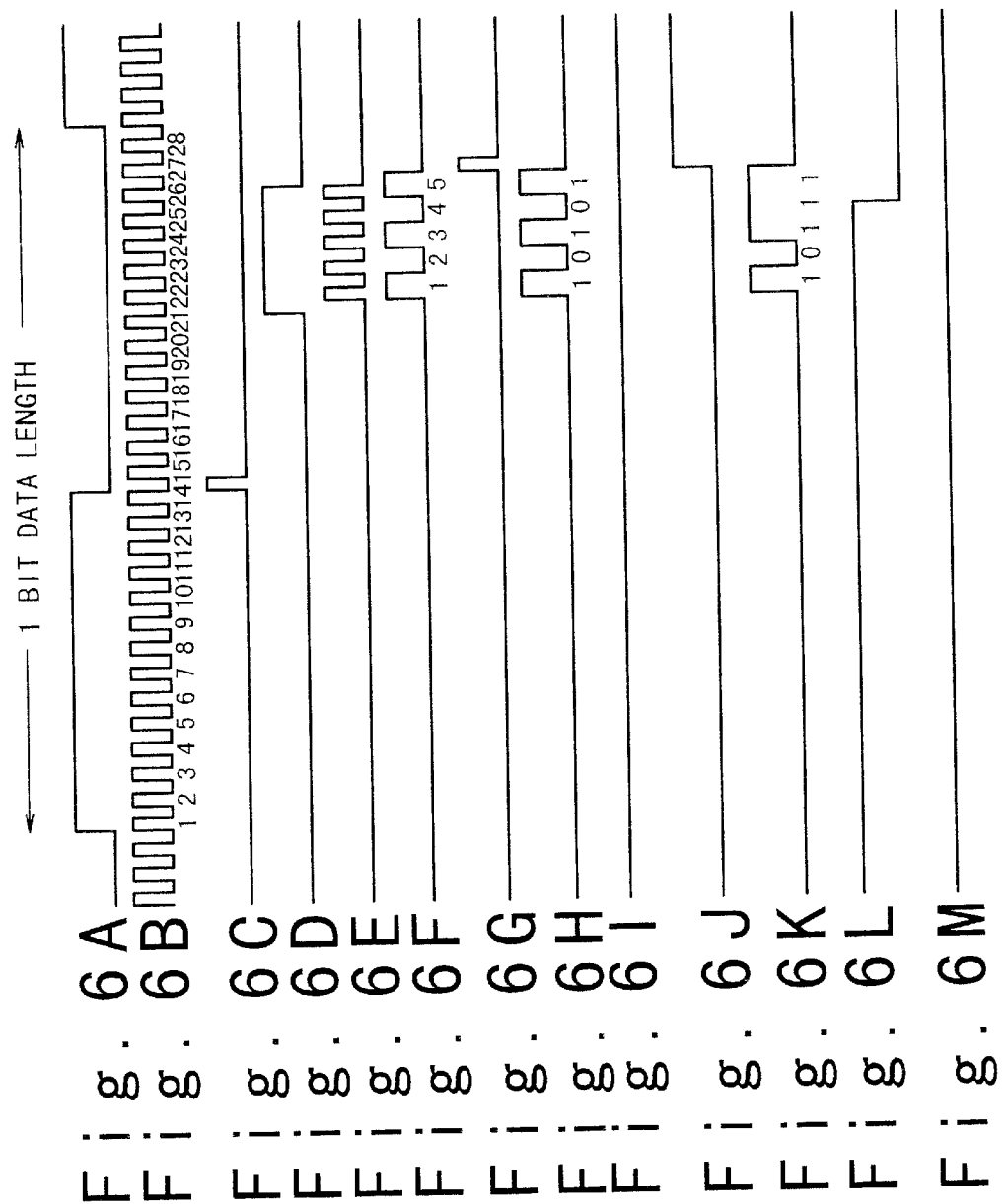
FIGS. 6A to 6M are timing charts to explain the operation of the preamble pattern detecting section in the radio communication apparatus according to the first embodiment of the present invention.

The signal A is a one pulse signal having a half clock signal length generated at the head of a second half of a data bit when the data bit is divided into 28 portions, namely, at a fifteenth clock signal, as shown in FIG. 6C. The signal B is a signal that rises up at a twenty-first clock signal and falls down at a twenty-sixth clock signal, as shown in FIG. 6D.

The signal C is a signal of an AND result of the signal line B and the reference oscillation clock signal i, as shown in FIG. 6E. The signal D is a clock signal having a period equal to two times of that of the signal C, as shown in FIG. 6F. The signal D is a signal obtained by frequency-dividing the signal C to have a bit pattern of "10101" from the leading edge of the signal C. This bit pattern is used as a comparison reference pattern. A reference pattern of five bits of "10101" is used in this embodiment. The signal I is a pulse having a half clock signal length generated at a twenty-seventh clock signal, as shown in FIG. 6G.

In addition, FIGS. 6H, 6I and 6J show waveforms of the signals b, H and d when the reference pattern is present in the preamble pattern. FIGS. 6K, 6L and 6M show waveforms of the signals b, H and d when the reference pattern is not present in the preamble pattern.

Referring to FIG. 5, the selector 202 selects and outputs any one of the signal E and the demodulated signal b in accordance with the signal B as a selection control signal. The selector 202 selects the signal E of the signal B is in the Hi level, and selects the demodulated signal b if the signal B is in the Lo level. As shown in FIG. 6D, the signal B is originally in the Lo level. Thus, one bit of the demodulated signal b, specifically, the preamble pattern is selected in response to the signal A shown in FIG. 6C. After that, an output from the shift register 203 is selected if the signal B be set to the Hi level.

The shift register 203 is a shift register having the N-bit structure, and shifts and outputs data within the shift register 203 in units of bits, in synchronization with the leading edge of a signal inputted to a terminal CLK of the shift register 203 from an OR gate 207. In this embodiment, N=5. At the same time, a bit selected by the selector 202 is inputted. While the reproduction clock signal c is in the Lo level within the same period, the input to the shift register 203 is switched to the output E side by the signal B. Then, the five bits of the data of the shift register 203 are circulated in response to the pulses of the signal C. That is, the bits of the preamble pattern selected by the selector 202 are written to the shift register 203 in response to the signal A, as shown in FIG. 6K. Accordingly, the newest five bits of the preamble pattern are held in the shift register 203, if each bit of the preamble pattern is sent. After that, the held bits are outputted from the shift register, in response to the signal C shown in FIG. 6E.

The comparator 204 is composed of an inverter 204-1 and exclusive OR gates 204-2, 204-3. As shown in FIG. 6F, each bit of the reference pattern D is sent from the shifted clock generating circuit 201 to the comparator 204. The inverter 204-1 of the comparator 204 inverts the reference pattern bit. The reference pattern bit and the inverted pattern bit are sent to the exclusive OR gates 204-2 and 204-3. At the same time, the newest five bits of the preamble pattern are sent from the shift register 203 to the exclusive OR gates 204-2 and 204-3. Thus, the reference pattern bits and the inverted reference pattern bits are respectively compared with the output E of the shift register by the exclusive OR gates 204-2 and 204-3, in respective bit unit.

The comparing results in the bit unit are respectively outputted from the exclusive OR gates 204-2 and 204-3 to the determining circuit 205 as the signals F and G. The signals F and G are in the Hi level if the comparing result indicates coincidence with each other. If the signal F remains in the Hi level, the determining circuit 205 can detect the presence of the preamble pattern.

An output H is initialized to "1" when the signal A in a reset level, namely, in the Hi level is sent to an RST terminal of the determining circuit 205. The determining circuit 205 determines the levels of the coincidence detection signals F and G at the falling edge of the clock signal C. The Lo level is outputted as the output H, as shown in FIGS. 6K, 6L and 6M, when the signal F and G the Lo level indicating the incoincidence is detected in the comparison of the five bits. On the other hand, the Hi level is outputted as the output H, as shown in FIGS. 6H, 6I and 6J, if the signal F or G of the Hi level indicating the coincidence is detected in the comparison of the five bits. The output H is latched by the holding circuit 206 in synchronization with a pulse timing of the signal I. The once-latched signal I in the Hi level is kept until the supply of the electrical power to the receiving and demodulating section 102 is stopped in response to the supply stop signal q. Accordingly, the presence or absence of the preamble pattern is determined.

As shown in FIGS. 6A to 6M, when the coincidence between a part of the preamble pattern and the reference pattern of "10101" is detected, the signal H is kept in the Hi level while they are compared with each other. Thus, the signal H is latched by the signal I, and the output d is also the output in the Hi level. If they are determined to be the incoincidence from the comparison result at the fourth bit, the signal H is switched to the Lo level, and the output d is also set to the Lo level indicating the incoincidence.

An intermittent reception of the radio communication apparatus according to the present invention will be described below with reference to a process flow in FIG. 7. It is supposed that the synchronization with the transmission frame is already established similarly to the conventional example described with reference to FIG. 2.

The electrical power is not supplied to the receiving and demodulating section 102 at present since the switch 109 is off. In addition, the data indicating the timing of the start of the preamble field is set in the counter coincidence detecting section 103-7 by the CPU 103-8. Since the synchronization with the transmission frame is established, the counter coincidence detecting section 103-7 determines whether or not the timing coincides with the preamble transmission timing, in accordance with the output of the counter section 103-6 (Step ST401). If the timings are not coincident with each other, the operation at the step ST401 is repeated until the timings coincide with each other.

If the CPU 103-8 determines the preamble transmission based on the counter coincidence detection signal m from the counter coincidence detecting section 103-7, the CPU 103-8 outputs a supply start signal to the switch 109. In response to the supply start signal, the switch 109 sends the electrical power from the power supply 108 to the receiving and demodulating section 102. As a result, the receiving and demodulating section 102 can be turned on (Step S402).

In succession, the data indicating the timing of the end of the preamble 1 field is set for the counter section 103-6 by the CPU 103-8. The counter coincidence detecting section 103-7 determines whether or not the present timing coincides with the preamble end timing, in accordance with the output of the counter section 103-6 (Step ST403). If both of the timings are not coincident with each other, the operation at the step ST403 is repeated until it coincides.

After the elapse of the preamble transmission end timing, the CPU 103-8 determines whether or not the preamble pattern is detected, in accordance with the preamble pattern detection signal d from the preamble pattern detecting section 103-2 (Step ST404). If the preamble pattern is not detected, the CPU 103-8 outputs the supply stop signal q to the switch 109. The switch 109 stops the supply of the electrical power to the receiving and demodulating section 102 from the power supply 108, in response to the supply stop signal. Accordingly, the receiving and demodulating section 102 is turned off (Step ST409)

After that, the CPU 103-8 sets the data corresponding to a preamble transmission timing of a next transmission frame for the counter section 103-6. For example, if the preamble pattern of the preamble 1 field is not detected, the CPU 103-8 sets the data corresponding to a timing of the head of the preamble 2 field in the counter section 103-6. In addition, if the preamble pattern of the preamble 2 field is not detected, the CPU 103-8 sets the data corresponding to a timing of the head of a preamble 1 field of the next frame in the counter section 103-6.

If determining that the preamble pattern is detected, in accordance with the preamble pattern detection signal d, the CPU 103-8 does not output the supply stop signal q. Thus, the receiving and demodulating section 102 remains in the ON state. Then, the sync signal detecting section 103-3 executes the process of detecting the sync signal 1 or 2 (Step ST405).

When detecting the sync signal 1 or 2, the sync signal detecting section 103-3 outputs the sync signal detection signal e as the interrupt signal to the CPU 103-8. When it is determined that the sync signal is detected, in accordance with the sync signal detection signal e (Step ST406) and it is further determined that a predetermined time elapses, in accordance with the counter coincidence detection signal m, the CPU 103-8 reads out an ID of the transmission frame from the buffer within the data extracting section 103-4 (Step ST408). The ID of the transmission frame is compared with an ID read out from the EEPROM 105.

If it is determined that the IDs are coincident with each other and further the effective data destined to the interstation is received, the CPU 103-8 outputs the supply stop signal q to the switch 109 without waiting for the transmission end of the transmission frame. The switch 109 stops the supply of the electrical power to the receiving and demodulating section 102 from the power supply 108, in response to the supply stop signal q. As a result, the receiving and demodulating section 102 can be turned off (Step S409). After that, the CPU 103-8 sets the data corresponding to a preamble transmission timing of the next transmission frame in the counter section 103-6.

If it is determined at the step ST406 that the sync signal is not detected, from the sync signal detection signal h, the CPU 103-8 determines whether or not the sync signal end timing elapses (Step ST407). If the sync signal end timing does not elapse, the operation at the step ST406 is repeated. If it is determined from the counter coincidence detection signal m that the sync signal end timing elapses, the CPU 103-8 outputs the supply stop signal q to the switch 109. The switch 109 stops the supply of the electrical power to the receiving and demodulating section 102 from the power supply 108, in response to the supply stop signal q. As a result, the receiving and demodulating section 102 can be turned off (Step ST409). After that, the CPU 103-8 sets the data corresponding to a preamble transmission timing of a next transmission frame for the counter section 103-6.

Figure 8:
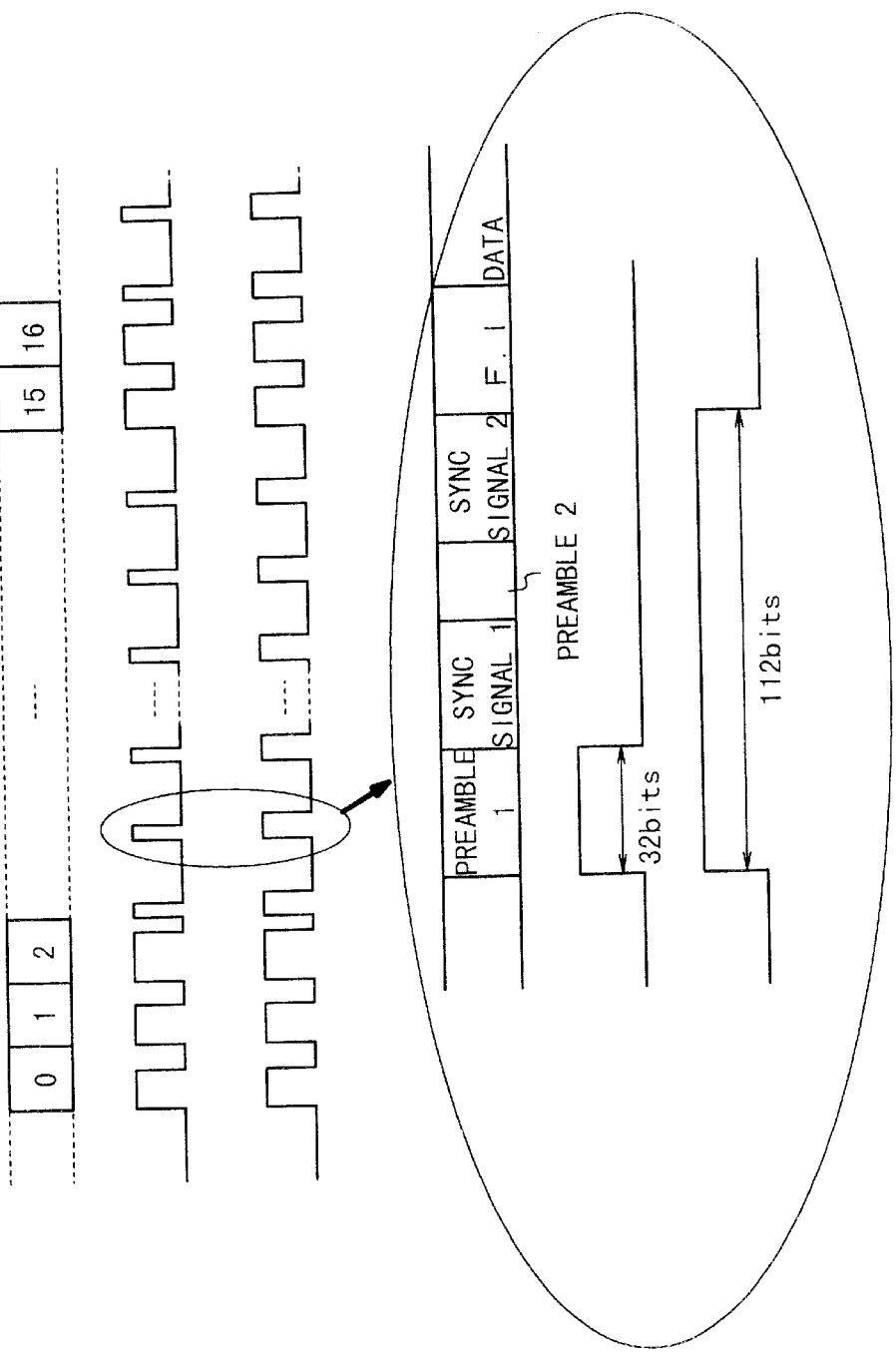
FIGS. 8A to 8F are timing charts to explain the difference of an intermittent reception controlling method between the radio communication apparatus according to the first embodiment of the present invention and the conventional radio communication apparatus.

FIGS. 8A to 8F show the waveforms in the intermittent reception control during the establishment of the synchronization according to the present invention. FIG. 8A shows the situation of transmitting the transmission frame. This shows the situation that only the transmission frames 0, 1 and 2 and the transmission frames 15, 16 are transmitted and the other transmission frames are stopped. FIG. 8B is an ON waveform showing an electrical power supplied to the receiving and demodulating section 102 in the first embodiment. FIG. 8C is an ON waveform showing an electrical power to the receiving and demodulating section 102 in the conventional radio communication apparatus. Both the waveforms are perfectly identical to each other if the transmission frame is transmitted. However, in a portion where the transmission stop frame is present, only the portion of the preamble has the ON waveform in the present invention. It could be understood that the electrical power supply time is shortened, as compared with the ON waveform in the conventional communication apparatus in which the electrical power is always supplied to the receiving and demodulating section up to the end portion of the sync signal 2.

Figure 9:
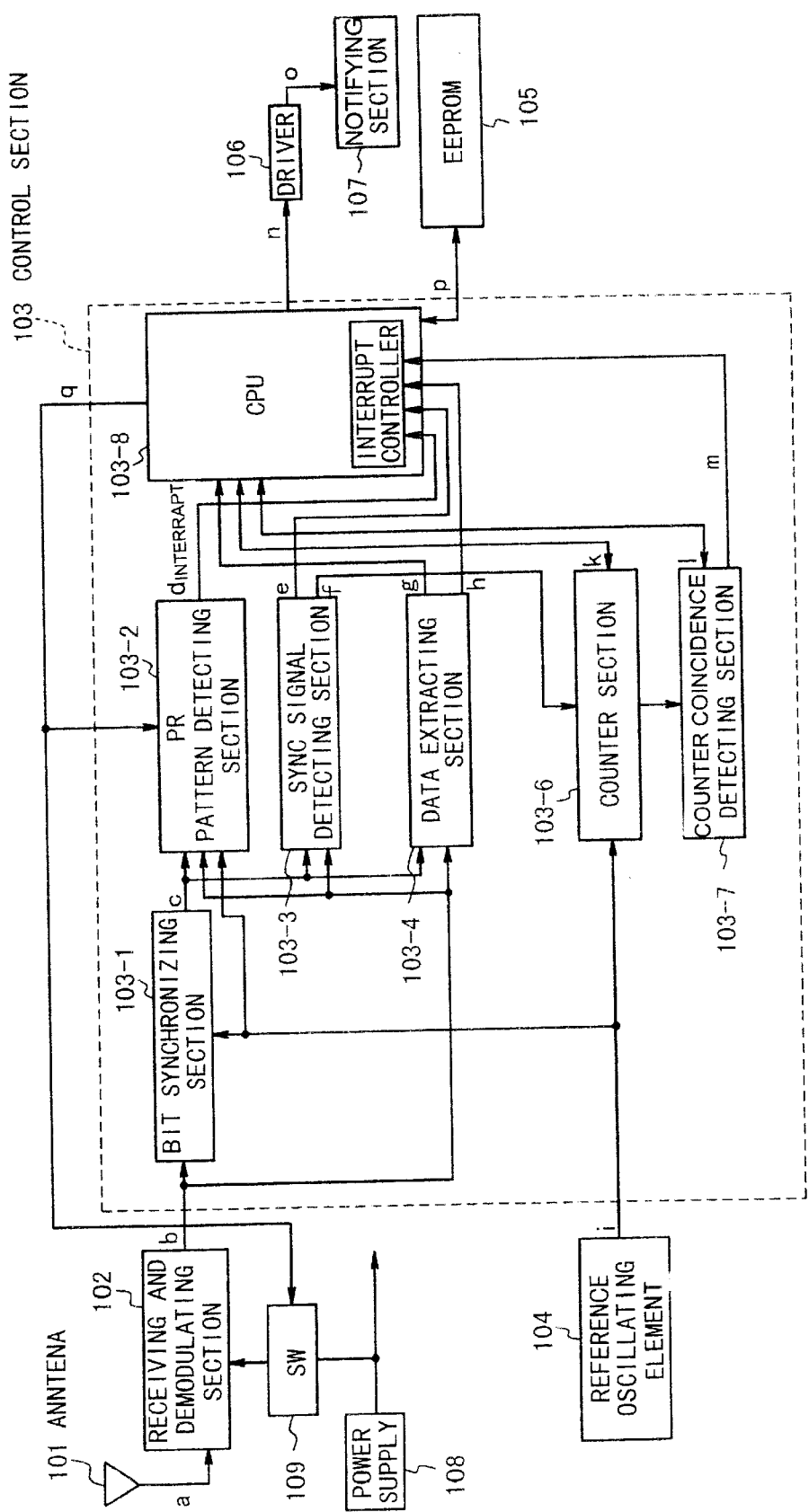
FIG. 9 is a block diagram showing the structure of a radio communication apparatus according to a second embodiment of the present invention.

A radio communication apparatus according to the second embodiment of the present invention will be described below with a radio selection call receiver as an example. FIG. 9 is a block diagram explaining the structure of the radio selection call receiver as the radio communication apparatus according to the second embodiment of the present invention.

As can be understood from FIG. 9, the structure of the radio selection call receiver in the second embodiment is almost similar to that of the first embodiment. The difference between them is in that the preamble pattern detection signal d of the preamble pattern detecting section 103-2 is sent to the interrupt controller of the CPU 103-8 as the interrupt signal.

The operations of the radio selection call receiver in the second embodiment will be described below with reference to FIG. 10.

Figure 7:
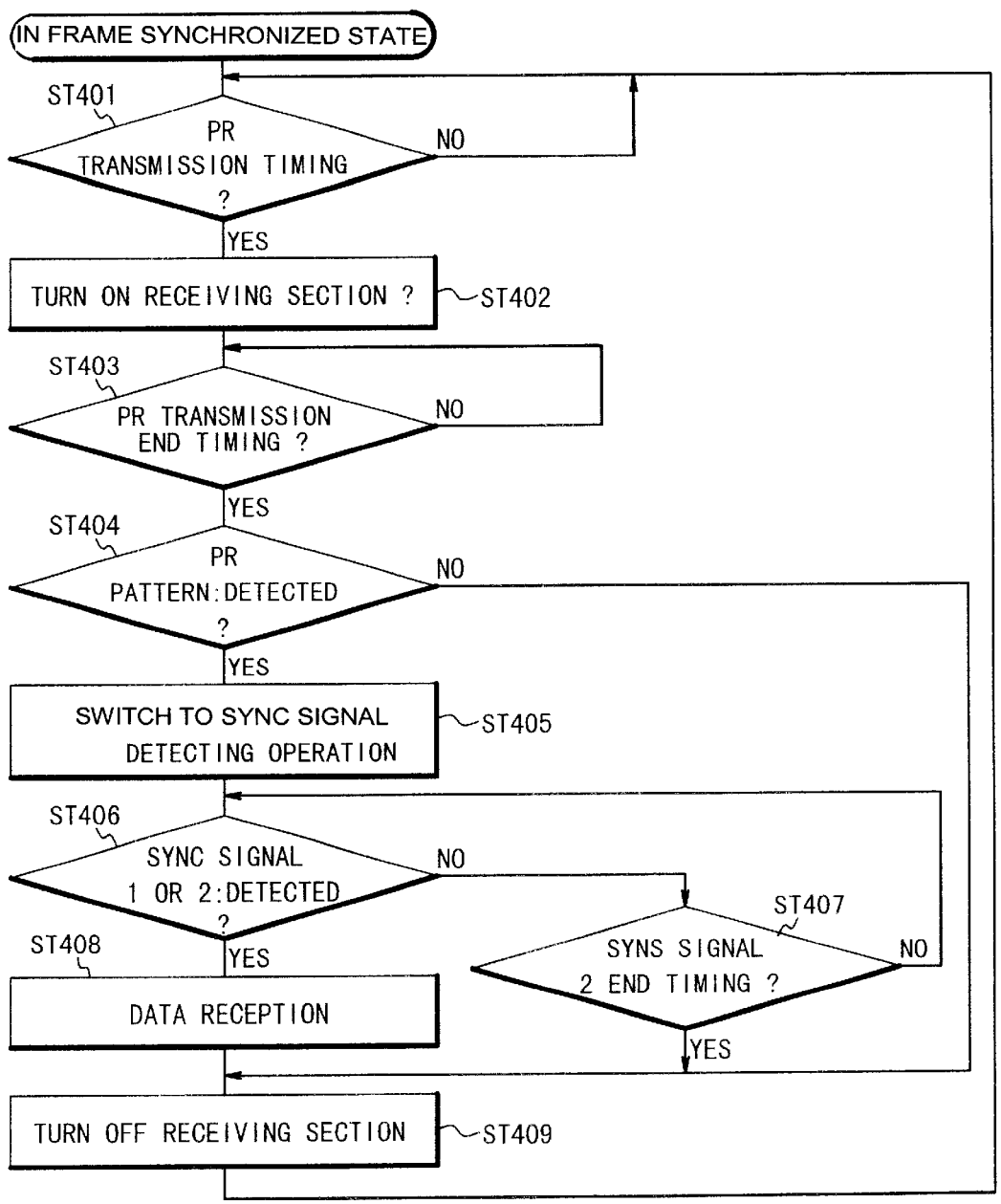
FIG. 7 is a flowchart to describe the operation of the radio communication apparatus according to the first embodiment of the present invention.
Figure 10:
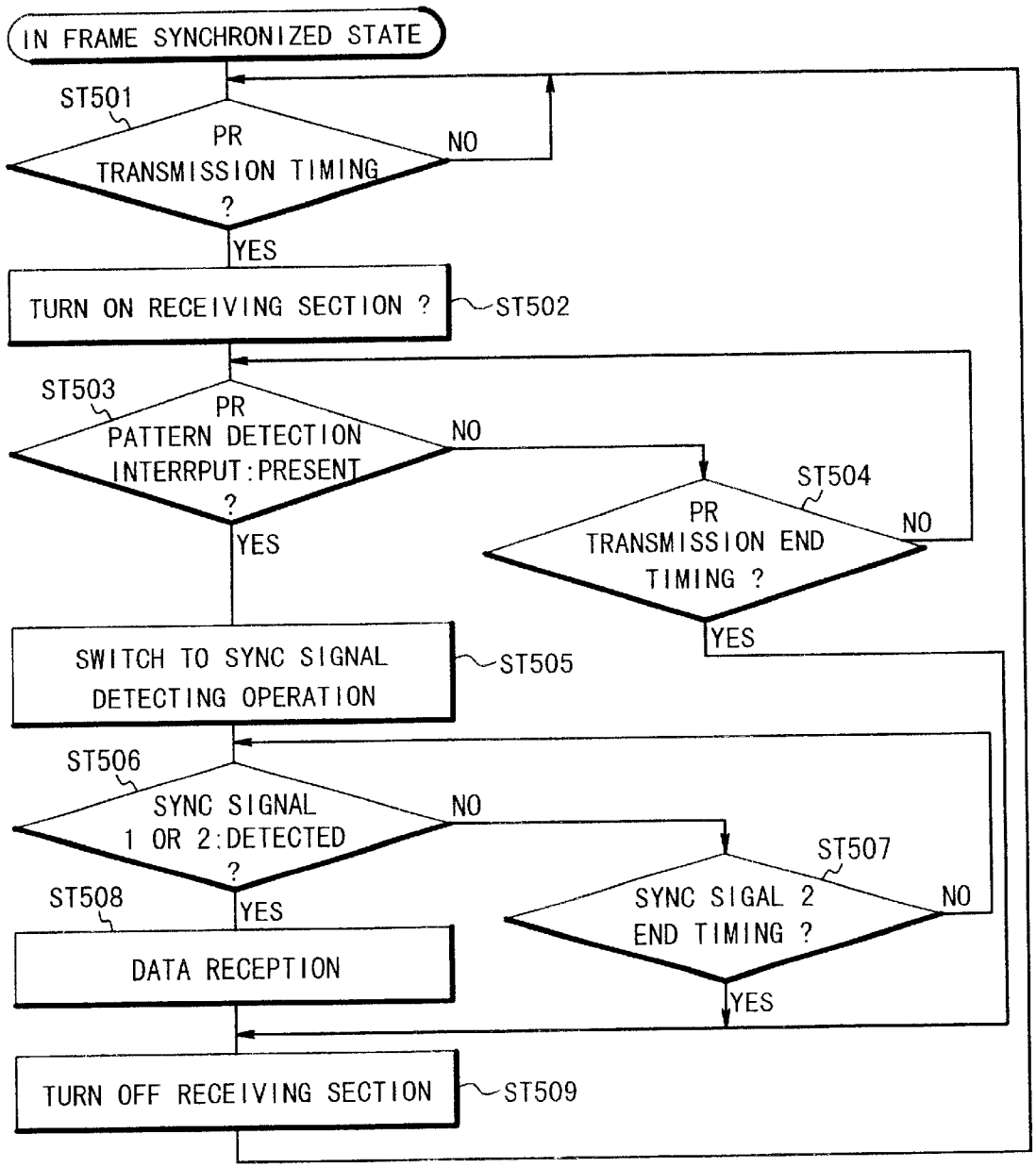
FIG. 10 is a flowchart to describe the operation of the radio communication apparatus according to the second embodiment of the present invention.

Referring to FIG. 10, steps ST501, ST502 are similar to the steps ST401, ST402 in FIG. 7. The operation at the step ST503 is similar to that of the step ST404 in FIG. 7.

In the second embodiment, the operation at the step ST504 is executed if the presence of the preamble pattern is not detected. The operation at the step ST504 is similar to that of the step ST403. The control returns back to the step ST503, if the present time is not the transmission end timing of the preamble field as the executed result at the step ST504. That is, the control waits for a preamble pattern detection interrupt signal d (Step ST503), until the end of the preamble transmission end timing, after the switch 109 is turned ON and thereby the electrical power is supplied from the power supply 108 to the receiving and demodulating section 102 (Step ST502).

If the presence of the preamble pattern is detected by the preamble pattern detecting section 103-2 at the step ST503, the preamble pattern detection signal d is sent to the CPU 103-8 as the interrupt signal.

In succession, the operation at the step ST505 is executed. The operation at the step ST505 is similar to that of the step ST405. That is, the supply stop signal q is not generated if the detection interrupt signal d of the preamble pattern is generated. The electrical power is supplied to the receiving and demodulating section 102 from the power supply 108. The receiving and demodulating section 102 remains in the ON state. After that, the control proceeds to the operation of detecting the sync signal (Step ST505). Herein after, the operations at steps ST506, ST507, ST508 and ST509 are similar to those at the steps ST406, ST407, ST408 and ST409.

In addition, if it is the end timing of the preamble field at the step ST504, the operation at the step ST509 is executed in succession. That is, if the preamble transmission end timing (Step ST504) elapses without the generation of the detection interrupt signal d, the supply stop signal q is outputted to the switch 109 so as to turn the switch 109 OFF (Step ST509).

Figure 11:
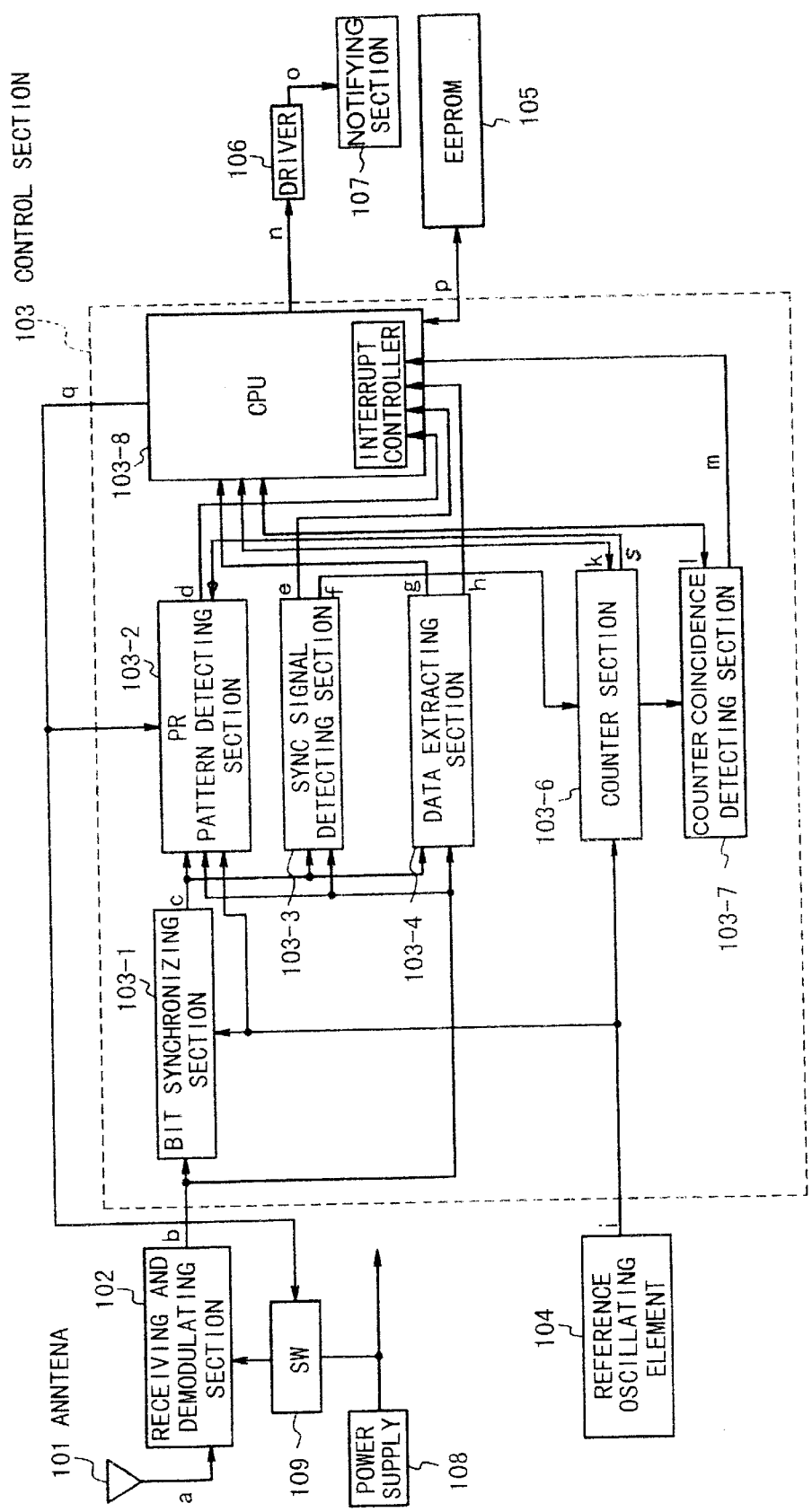
FIG. 11 is a block diagram showing the structure of a radio communication apparatus according to a third embodiment of the present invention.

A radio communication apparatus of a third embodiment in the present invention will be described below taking a radio selective call receiver as an example. FIG. 11 is a block diagram showing the structure of the radio selection call receiver according to the third embodiment of the present invention.

As can be understood from FIG. 11, the structure of the radio selective call receiver in the third embodiment is almost similar to that of the first embodiment. The difference between them is in that a signal s is sent from the counter section 103-6 to the preamble pattern detecting section 103-2.

The operation of the radio selective call receiver in the third embodiment will be described below with reference to FIGS. 12A to 12F.

Figure 12:
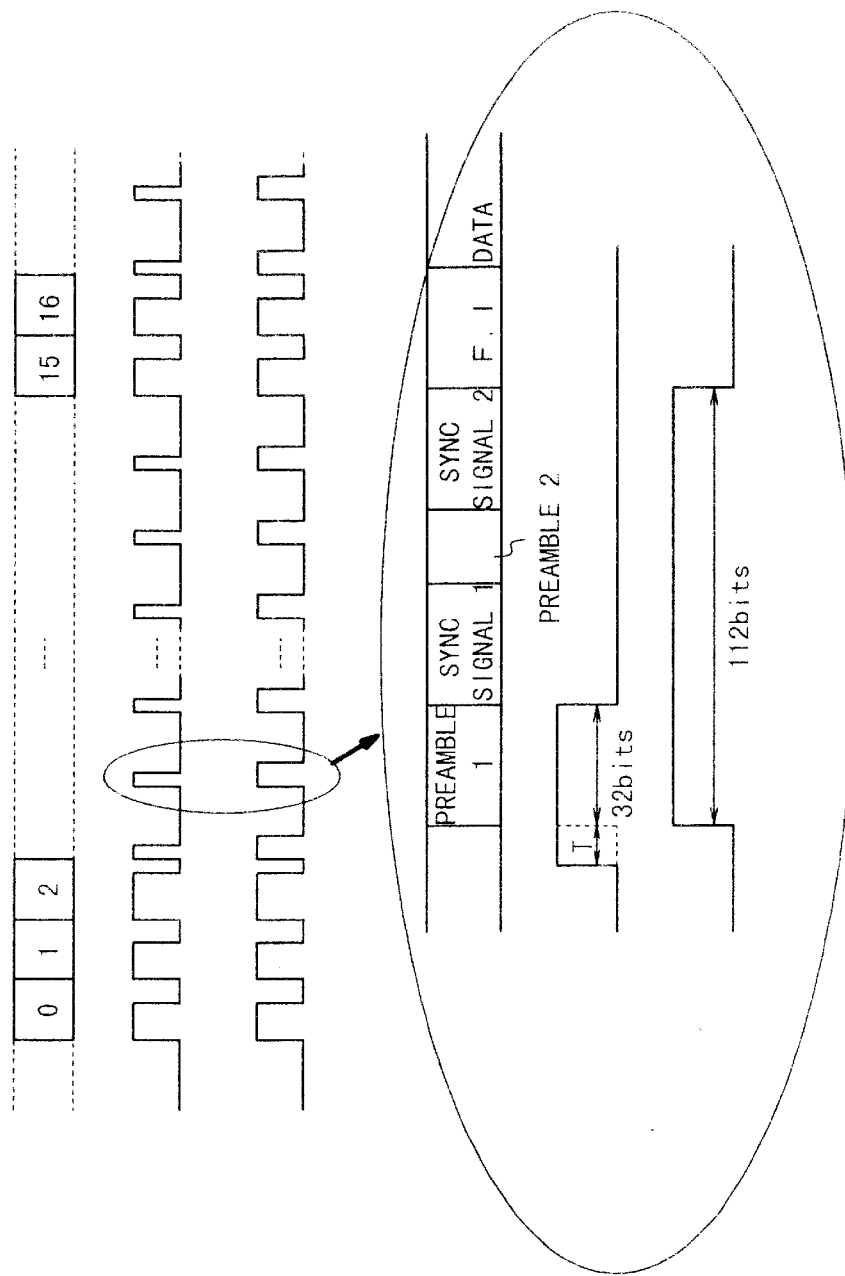
FIGS. 12A to 12F are timing charts to describe the difference of an intermittent reception controlling method between the radio communication apparatus according to the third embodiment of the present invention and the conventional radio communication apparatus.

Referring to FIGS. 12A to 12F, FIGS. 12A to 12F except FIG. 12E are similar to FIGS. 8A to 8D and 8F.

In the third embodiment, the data corresponding to a timing earlier than the preamble field by a time T is set for the counter coincidence detecting section 103-7 by the CPU 103-8. If the counter coincidence detection signal m is outputted from the counter coincidence detecting section 103-7, the CPU 1038 outputs the supply start signal q to the switch 109. As a result, the receiving and demodulating section 102 can be turned ON. After that, the counter section 103-6 generates the signal s at the start timing of the preamble field to output to the preamble pattern detecting section 103-2. The preamble pattern detecting section 103-2 starts the operation similarly to the first embodiment, in response to the signal s. This reason is as follows. That is, the receiving and demodulating section 102 does not become immediately in a stable operation state even if the electrical power is supplied. For this reason, the preamble pattern can be received after the receiving and demodulating section 102 becomes in the stable operation state, by supplying the electrical power earlier by the time T.

Moreover, there may be a fear that a data portion of a previous frame is erroneously detected as the preamble pattern, since the electrical power is supplied, even if the receiving and demodulating section is unstable. Thus, the operational of the preamble pattern detecting section is started in response to the signal s.

The other operations are similar to those shown in FIG. 7. Thus, the explanation is omitted.

A preamble pattern detecting section in a modification example of the third embodiment in the present invention will be described below with reference to FIG. 13.

Figure 13:
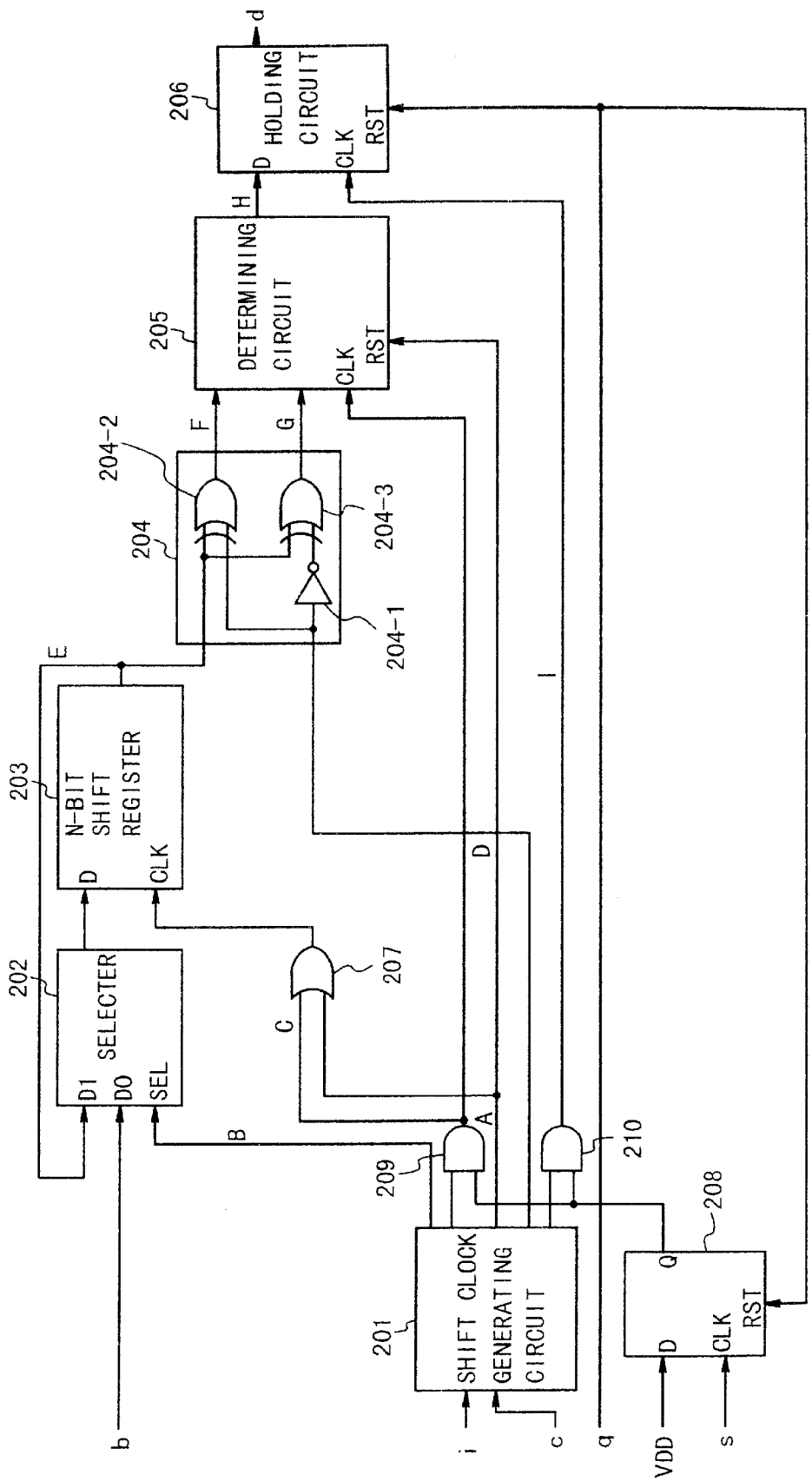
FIG. 13 is a block diagram showing the structure of a modification example of the preamble pattern detecting section in the radio selection call receiver according to the third embodiment of the present invention.

Referring to FIG. 13, the shifted clock generating circuit 201, the selector 202, the shift register 203, the comparator 204, the judging circuit 205 and the holding circuit 206 are respectively similar to those shown in FIG. 5. Moreover, a flip-flop 208 and AND gates 209 and 210 are added to this embodiment. A signal s is generated each time a frame is updated by the counter section 103-6. The flip-flop 208 sets a voltage Vdd of the Hi level in response to the signal s. As a result, the signal of the Hi level can be outputted from a Q output. This signal of the Hi level is sent to the AND gates 209 and 210. The signals C and I in FIG. 5 are sent to the AND gates 209 and 210. As a result, when the signal s is inputted, namely, when the frame is updated, the signals C and I in FIG. 5 can be outputted. The flip-flop is reset in response to the signal Q, simultaneously with the holding circuit 206. As a result, a signal of the Lo level is outputted from the Q output of the flip-flop 208.

As mentioned above, in the intermittently receiving method of the radio communication apparatus according to the present invention, the preamble pattern detecting section 103-2 uses the demodulation signal b from the receiving and demodulating section 102, the reproduction clock c that is the output of the bit synchronizing section 105-1 and the reference clock signal. Thus, the presence or absence of the preamble pattern can be detected. For example, if the number of bits in the reference pattern is assumed to be five, it is detected whether or not the pattern "10101" or the inverted pattern "01010"b is absent in the preamble pattern. The detected result is outputted as the preamble pattern detection signal d. The signal d of the Hi level indicates that the pattern is detected, and the signal d of the Lo level indicates that the pattern is not detected.

The receiving and demodulating section 102 is turned ON at the transmission timing of the preamble field. The receiving and demodulating section 102 is kept in the ON state until the transmission end timing of the preamble field. It is determined whether or not the presence of the preamble pattern is detected until the transmission end timing, in accordance with the signal d. If the presence of the preamble pattern is not detected, the switch 109 is turned OFF, and the receiving and demodulating section 102 is also turned OFF. After that, the receiving and demodulating section 102 remains in the waiting state until a transmission timing of a preamble field of the next transmission frame.

The switch 109 remains in the ON state if the presence of the preamble pattern is detected. As a result, the receiving and demodulating section can remain in the ON state. In succession, the operation of detecting the sync signal is carried out. If the sync signal is not detected until the transmission end timing of the sync signal, the switch 109 is turned OFF, and the receiving and demodulating section is also turned OFF. After that, the receiving and demodulating section 102 waits for the next transmission frame.

If the sync signal is detected, the data reception is successively carried out. When it is determined that the reception of the effective data within this transmission frame is ended, the switch 109 is turned OFF without waiting for the end of the transmission frame, and the receiving and demodulating section is also turned OFF.

In this way, it is possible to reduce a ratio of a period while the receiving and demodulating section remains in the ON state, to the total time of the transmission frame. It is also possible to reduce the ratio of a period while the receiving and demodulating section remains in the ON state, even in the transmission frame where the transmission stop state is present.

As mentioned above, according to the present invention, the preamble pattern is detected before the sync signal is detected, in the condition that the synchronization with the transmission frame is established. Only if the preamble pattern is detected, the receiving and demodulating section remains in the ON state, and the control proceeds to the operation of detecting the sync signal. As a result, although the reception of the transmission frame is perfectly similarly to the conventional technique, the receiving and demodulating section can be turned off in a short time, when the transmission stop frame is received.

What is claimed is:

1. A radio communication apparatus comprising:
 an antenna for receiving a radio signal wherein said radio signal is composed of a preamble field for storing information for correction of a synchronization bit, a sync signal field for storing a sync signal, and a data field for storing data;

a receiving and demodulating section which receives, demodulates and amplifies said radio signal when electric power is supplied;

a power supply section which supplies said electrical power to said receiving and demodulating section through a switch, responding to a supply start signal and a supply stop signal, generated by a control section;

a reference oscillating element for generating a reference oscillation clock signal;

an Electrically Erasable Programmable Read-only Memory (EEPROM) for storing an intra-station ID;

the control section which generates said supply stop signal when presence of said preamble pattern can not be detected from said radio signal received by said receiving and demodulating section, in a state in which a frame synchronization is established, extracts a message and an ID from a demodulated radio signal and compares the ID stored in the Electrically Erasable Programmable Read-only Memory (EEPROM) with transmitted ID to send a message to an inter-station, if the ID stored in the EEPROM and the transmitted ID are the same;

a notifying section for notification of a message reception to a user of the said receiver; and a driver for driving said notifying section.

2. A radio communication apparatus according to claim 1, wherein said control section determines that said preamble pattern is not present, to generate said supply stop signal, when a portion coincident with a predetermined reference pattern is not present within said preamble field.

3. A radio communication apparatus according to claim 2, wherein said control section comprises:

a bit synchronizing section for generating a reproduction clock signal for data sampling using said demodulated radio signal from said receiving and demodulating section and the reference oscillation clock signal from said reference oscillating element;

a preamble pattern detecting section which detects a signal from said reproduction clock signal, said demodulated signal and said reference oscillation clock signal, whether or not the preamble pattern is presented in the preamble field of the demodulated signal;

a sync signal detecting section which detects said sync signal from said radio signal received by said receiving section to generate a sync signal detection signal without generating said supply stop signal, when the presence of said preamble pattern is detected;

a data extracting section with a buffer which uses said reproduction clock signal to extract a transmission data from the data field and stores the data in the buffer;

a CPU with an interrupt controller which sets a counter value, reads out transmission frame information from a FI field stored in the data extracting section corresponding to a time length of the preamble field, the sync field and outputs said power supply start signal to the said switch at the timing when the preamble field starts, in the state that the synchronization with the transmission frame is established;

a counter section which counts said clock signal, and generates a preamble end time signal when the counted value reaches a first predetermined value, and wherein said control section generates said supply stop signal in response to said preamble end time signal, when the portion coincident with said predetermined reference pattern is not detected within said radio signal received by said receiving and demodulating section.

4. A radio communication apparatus according to claim 3, wherein said control section outputs said supply stop signal to said power supply section, when said sync signal is not detected during a predetermined period after said control section detects said preamble pattern.

5. A radio communication apparatus according to claim 3, wherein said counter counts said clock signal to a second predetermined value after counting said first predetermined value, and generates a sync signal end time signal when the count value reaches said second predetermined value, and wherein said control section sends said supply stop signal to said power supply section in response to said sync signal end time signal, when said sync signal is not detected while said counter counts said clock signal to said second predetermined value.

6. A radio communication apparatus comprising:

an antenna for receiving a radio signal wherein said radio signal is composed of a preamble field for storing information for correction of a synchronization bit, a sync signal field for storing a sync signal, and a data field for storing a data;

a receiving and demodulating section which receives, demodulates and amplifies said radio signal, when an electrical power is supplied in a state in which a frame synchronization is established, said radio signal having a preamble field for storing a preamble pattern;

a power supply section which supplies said electrical power to said receiving and demodulating section through a switch in response to a supply start signal and stops the supply of said electrical power to said receiving and demodulating section in response to a supply stop signal;

a reference oscillating element for generating a reference oscillation clock signal;

an Electrically Erasable Programmable Read-only Memory (EEPROM) for storing an intra-station ID; and a control section which generates the supply start signal at a start timing of said preamble field and generates said supply stop signal when presence of said preamble pattern can not be detected from said radio signal received by said receiving and demodulating section, extracts a message and an ID from a demodulated radio signal and compares the ID stored in the Electrically Erasable Programmable Read-only Memory (EEPROM) with transmitted ID to send a message to an inter-station, if the ID stored in the EEPROM and the transmitted ID are the same;

a notifying section for notification of a message reception to a user of the said receiver;

a driver for driving said notifying section.

7. A radio communication apparatus according to claim 6, wherein said control section determines that said preamble pattern is not present, to generate said supply stop signal, when a portion coincident with a predetermined reference pattern is not present within said preamble field.

8. A radio communication apparatus according to claim 7, wherein said control section comprises:

a bit synchronizing section which generates a reproduction clock signal for data sampling using said demodulated radio signal from said receiving and demodulating section and the reference oscillation clock signal from said reference oscillating element;

a preamble pattern detecting section which detects from said reproduction clock signal, said demodulated signal and said reference oscillation clock signal, whether or not the preamble pattern is presented in the preamble field of the demodulated signal;

a sync signal detecting section which detects said sync signal from said radio signal received by said receiving and demodulating section and generates a sync signal detection signal without generating said supply stop signal, when the presence of said preamble pattern is detected;

a data extracting section with a buffer which uses said reproduction clock signal to extract a transmission data from the data field and stores the data in the buffer;

a CPU with an interrupt controller which sets a counter value, reads out transmission frame information from a FI field stored in the data extracting section corresponding to a time length of the preamble field, the sync field and outputs said power supply start signal to the said switch at the timing when the preamble field starts, in the state that the synchronization with the transmission frame is established;

a counter section which counts said clock signal and generates a preamble and time signal when the counted value reaches a first predetermined value, and wherein said control section generates said supply stop signal in response to said preamble end time signal, when the portion coincident with said predetermined reference pattern is not detected within said radio signal received by said receiving and demodulating section.

9. A radio communication apparatus according to claim 8, wherein said control section outputs said supply stop signal to said power supply section, when said sync signal is not detected during a predetermined period after said control section detects said preamble pattern.

10. A radio communication apparatus according to claim 8, wherein said counter counts said clock signal to a second predetermined value after counting said first predetermined value, and generates a sync signal end time signal when the counted value reaches said second predetermined value, and wherein said control section sends said supply stop signal to said power supply section in response to said sync signal end time signal, when said sync signal is not detected while said counter counts said clock signal to said second predetermined value.

11. A radio communication apparatus comprising:

an antenna for receiving a radio signal wherein said radio signal is composed of a preamble field for storing information for correction of a synchronization bit, a sync signal field for storing a sync signal, and a data field for storing a data;

a receiving and demodulating section which receives, demodulates and amplifies said radio signal, when electrical power is supplied in a state in which a frame synchronization is established, wherein said radio signal having a preamble field for storing a preamble pattern;

a power supply section which supplies said electrical power to said receiving and demodulating section through a switch, responding to a supply start signal and a supply stop signal, generated by a control section;

a reference oscillating element for generating a reference oscillation clock signal;

an Electrically Erasable Programmable Read-only Memory (EEPROM) for storing an intra-station ID;

the control section which generates the supply start signal earlier than a start timing of said preamble field by a predetermined time and generates said supply stop signal when presence of said preamble pattern can not be detected from said radio signal received by said receiving and demodulating section and extracts a message and an ID from a demodulated radio signal and compares the ID stored in the Electrically Erasable Programmable Read-only Memory (EEPROM) with transmitted ID to send a message to an inter-station, if both the ID stored in the EEPROM and the transmitted ID are the same;

a notifying section for notification a message reception to a user of the said receiver; and a driver for driving said notifying section.

12. A radio communication apparatus according to claim 11, wherein said control section determines that said preamble pattern is not present, to generate said supply stop signal, when a portion coincident with a predetermined reference pattern is not present within said preamble field.

13. A radio communication apparatus according to claim 12, wherein said control section comprises:

a bit synchronizing section which generates a reproduction clock signal for data sampling using said demodulated radio signal from said receiving and demodulating section and the reference oscillation clock signal from said reference oscillating element;

a preamble pattern detecting section which detects signal from said reproduction clock signal, said demodulated signal and said reference oscillation clock signal, whether or not the preamble pattern is presented in the preamble field of the demodulated signal;

a sync signal detecting section which detects said sync signal from said radio signal received by said receiving and demodulating section and generates a sync signal detection signal without generating said supply stop signal, when the presence of said preamble pattern is detected;

a data extracting section with a buffer which uses said reproduction clock signal to extract a transmission data from the data field and stores the data in the buffer;

a CPU with an interrupt controller which sets a counter value, reads out transmission frame information from a FI field stored in the data extracting section corresponding to a time length of the preamble field, the sync field and outputs said power supply start signal to the said switch at the timing when the preamble field starts, in the state that the synchronization with the transmission frame is established;

a counter section which counts said clock signal and generates a preamble end time signal when a counted value reaches a first predetermined value, and wherein said control section generates said supply stop signal in response to said preamble end time signal, when said portion coincident with said predetermined reference pattern is not detected within said radio signal received by said receiving and demodulating section.

14. A radio communication apparatus according to claim 13, wherein said control section outputs said supply stop signal to said power supply section, when said sync signal is not detected during a predetermined period after said control detecting section detects said preamble pattern.

15. A radio communication apparatus according to claim 13, wherein said counter counts said clock signal to a second predetermined value after counting said first predetermined value, and generates a sync signal end time signal when the counted value reaches said second predetermined value, and wherein said control section sends said supply stop signal to said power supply section in response to said sync signal end time signal, when said sync signal is not detected while said counter counts said clock signal to said second predetermined value.

16. An intermittently receiving method in a synchronization establishing state in a radio communication apparatus, comprising steps of:

receiving a radio signal by a receiving and demodulating section when an electronic power is supplied to said receiving and demodulating section, said radio signal having a preamble field for storing a preamble pattern;

supplying electrical power to said receiving and demodulating section through a switch, responding to a supply start signal and a supply stop signal, generated by a control section;

stopping the supply of said electrical power to said receiving and demodulating section in response to said supply stop signal; and generating said supply stop signal when presence of said preamble pattern can not be detected from the radio signal received by said receiving and demodulating section, in a state in which a frame synchronization is established, extracting a message and an ID from a demodulated radio signal, comparing the ID stored in a Electrically Erasable Programmable Read-only Memory (EEPROM) with transmitted ID to send a message to an inter-station, if the ID stored in the EEPROM and the transmitted ID are the same, notifying a user of the said receiver about a message reception.

17. An intermittently receiving method according to claim 16, further comprising generating a supply start signal, and wherein said supplying includes suppling said electric power to said receiving and demodulating section in response to said supply start signal.

18. An intermittently receiving method according to claim 17, wherein said generating a supply start signal includes generating said supply start signal at a start timing of said preamble field.

19. An intermittently receiving method according to claim 17, wherein said generating a supply start signal includes generating said supply start signal earlier than a start timing of said preamble field by a predetermined time.

20. An intermittently receiving method according to claim 16, wherein said generating said supply stop signal includes generating said supply stop signal when it is determined that a portion coinciding with a predetermined reference pattern is not present within said preamble field.

21. An intermittently receiving method according to claim 20, wherein said generating said supply stop signal includes:

generating a preamble end time signal when a first predetermined time elapses from a start of said preamble field; and generating said supply stop signal in response to said preamble end time signal, when a portion coinciding with a predetermined reference pattern is not detected within said radio signal received by said receiving and demodulating section.

22. An intermittently receiving method according to claim 16, wherein said radio signal has a sync field for storing a sync signal and a data field for storing data, in addition to said preamble field, wherein said method further includes:

detecting said sync signal from said radio signal received by said receiving and demodulating section to generate a sync signal detection signal without generating said supply stop signal, when the presence of said preamble pattern is detected; and receiving said data from said radio signal received by said receiving and demodulating section, in response to said sync signal detection signal.

23. An intermittently receiving method according to claim 16, wherein said radio signal has a signal field for storing a sync signal and a data field for storing data, in addition to said preamble field, and wherein said generating of said supply stop signal further includes:

generating said supply stop signal when said signal is not detected during a first predetermined period after the presence of said preamble pattern is detected.

24. An intermittently receiving method in a complete synchronization establishing state in a radio communication apparatus comprising:

an antenna for receiving a radio signal wherein said radio signal is composed of a preamble field for storing information for correction of a synchronization bit, a sync signal field for storing a sync signal, and a data field for storing data;

a receiving and demodulating section which receives, demodulates and amplifies said radio signal when electric power is supplied;

a power supply section which supplies said electrical power to said receiving and demodulating section through a switch, responding to a supply start signal and a supply stop signal, generated by a control section;

a reference oscillating element for generating a reference oscillation clock signal:

an Electrically Erasable Programmable Read-only Memory (EEPROM) for storing an intra-station ID;

the control section which generates and said supply stop signal when presence of said preamble pattern can not be detected from said radio signal received by said receiving and demodulating section, in a state in which a frame synchronization is established, extracts a message and an ID from a demodulated radio signal and compares the ID stored in the Electrically Erasable Programmable Read-only Memory (EEPROM) with transmitted ID to send a message to an inter-station, if the ID stored in the EEPROM and the transmitted ID are the same;

a notifying section for notification of a message reception to a user of the said receiver;

a driver for driving said notifying section and comprising the steps of:

receiving a radio signal by a receiving and demodulating section when an electrical power is supplied to said receiving and demodulation section, said radio signal having a preamble field for storing a preamble pattern;

suppling electrical power to said receiving and demodulating section;

generating a continuos synchronizing code;

stopping the supply of said electrical power to said receiving and demodulating section in response to a supply stop signal; and generating said supply stop signal when presence of said preamble pattern can not be detected from the radio signal received by said receiving and demodulating section.

* * * * *